E. BEHR.
INSECT TRAPPING AND KILLING MACHINE.
APPLICATION FILED JUNE 27, 1918.
1,277,531.
Patented Sept. 3, 1918.
4 SHEETS—SHEET 3.
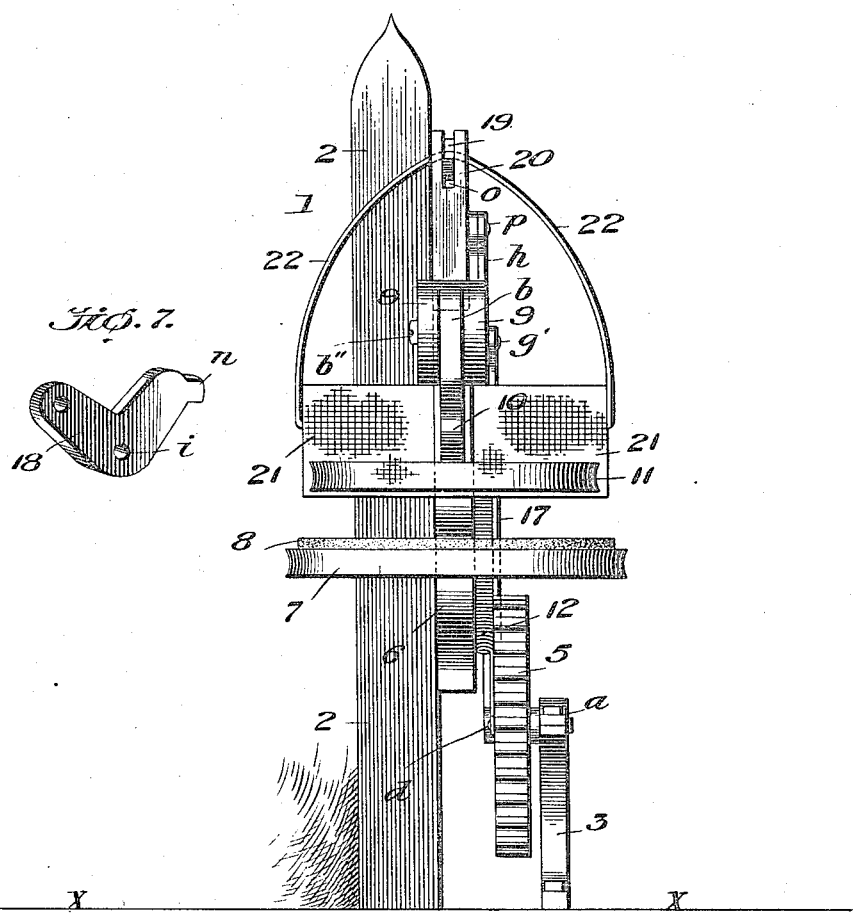

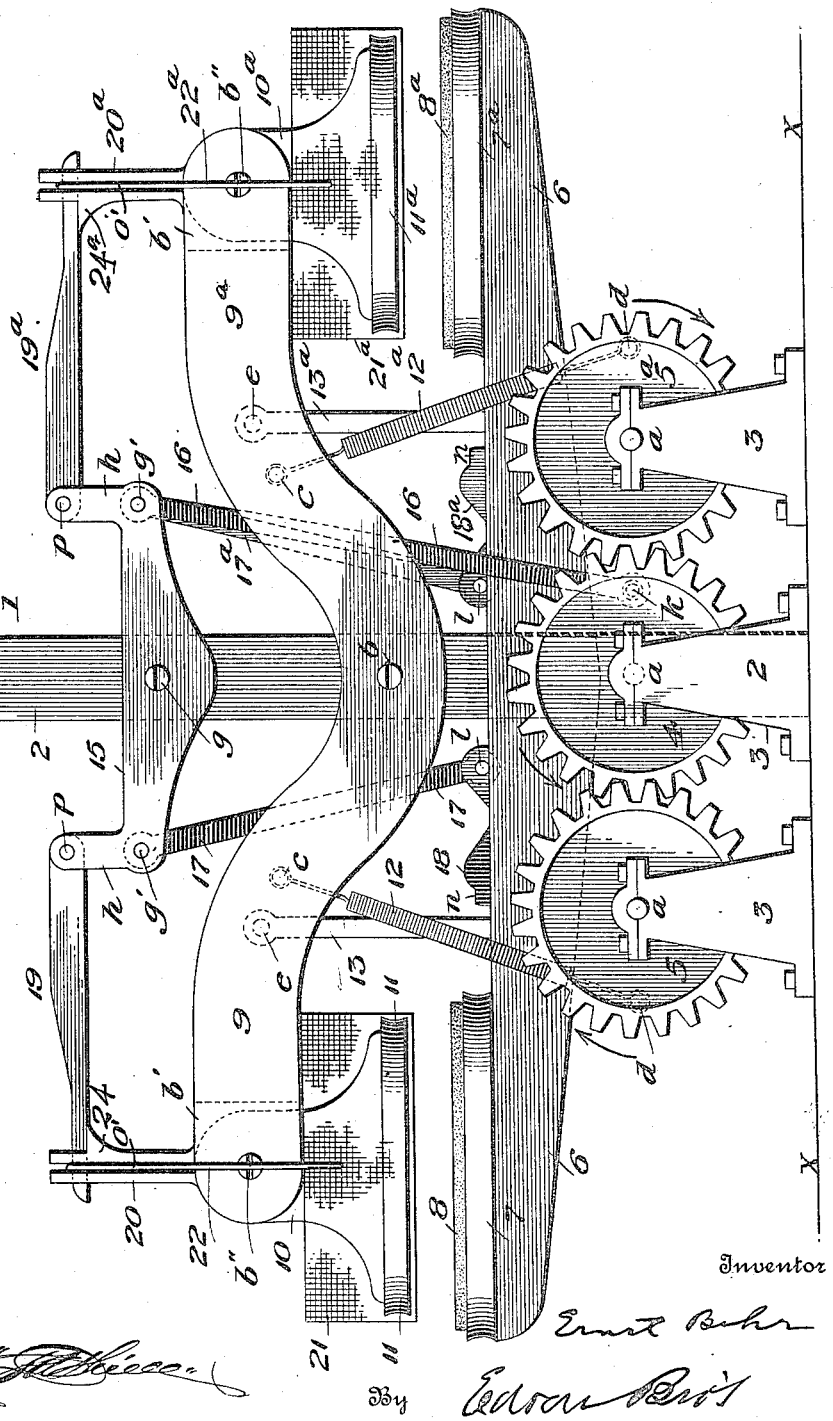

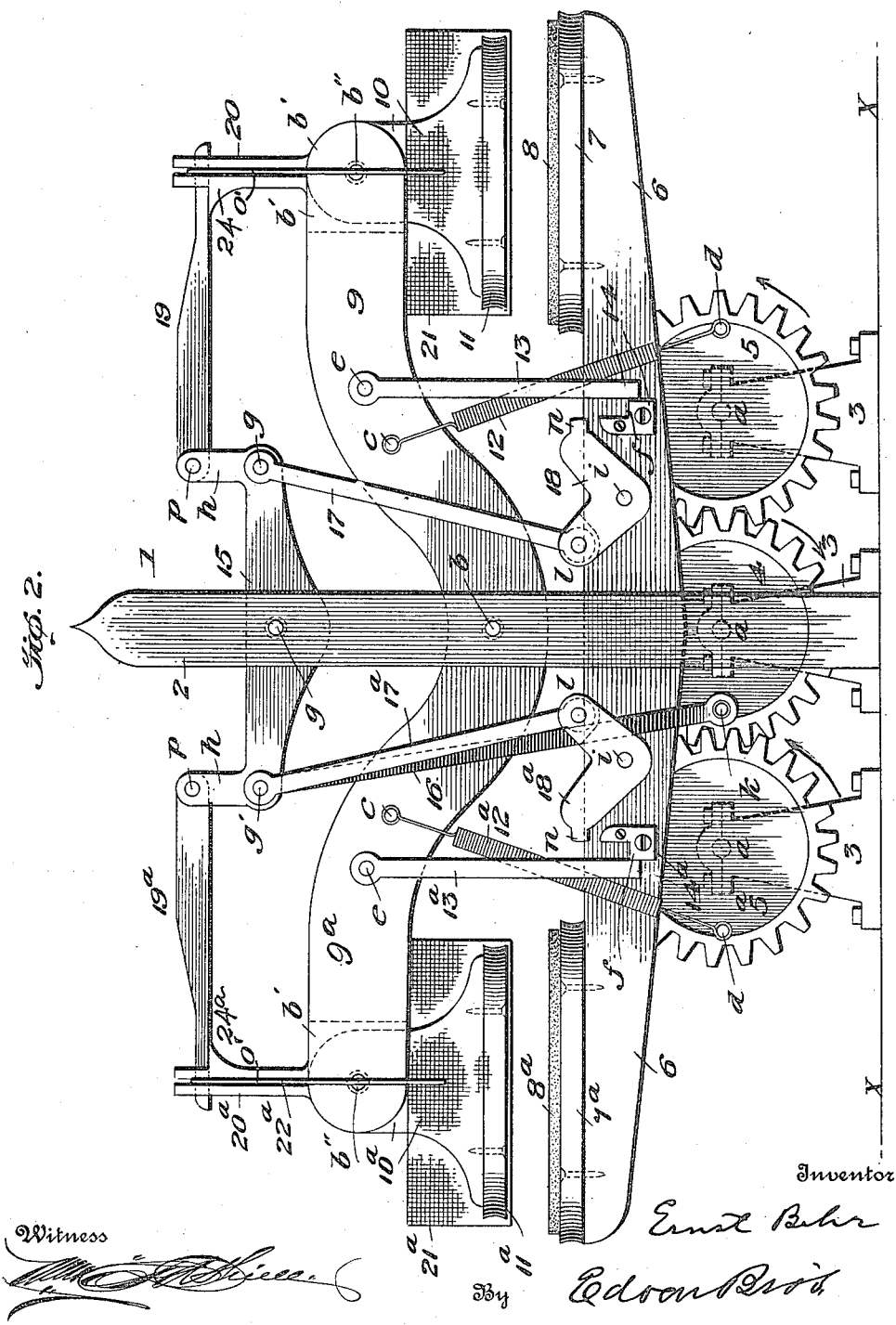

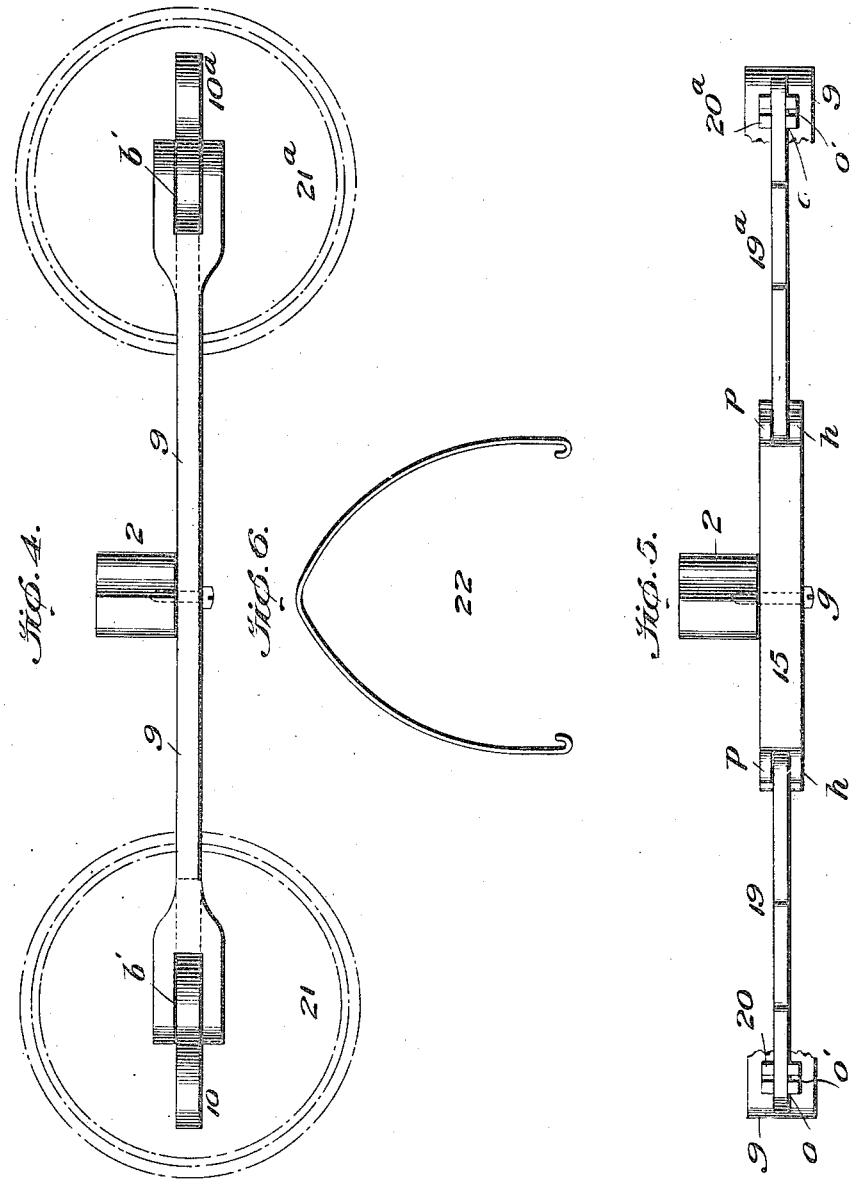

UNITED STATES PATENT OFFICE.

ERNST BEHR, OF SARATOGA SPRINGS, NEW YORK.

INSECT TRAPPING AND KILLING MACHINE.

1,277,531.   Specification of Letters Patent.   Patented Sept. 3, 1918.

Application filed June 27, 1918. Serial No. 242,198.

*To all whom it may concern:*

Be it known that I, ERNST BEHR, a subject of the Emperor of Germany, who has declared his intention to become a citizen of the United States, residing at Saratoga Springs, in the county of Saratoga and State of New York, have invented certain new and useful Improvements in Insect Trapping and Killing Machines; and I do hereby declare the following to be a full, clear, and exact description of the invention, such as will enable others skilled in the art to which it appertains to make and use the same.

This invention relates to a machine for trapping and killing insects, such as flies, mosquitoes, and ants, and adapted more particularly for use in kitchens, bakeries, confectioneries and similar places.

The principal object of my invention is to provide a partially automatic, double acting trapping and crushing machine, in which a pair of screen-traps are alternately raised and lowered to expose and inclose a bait pad, and at properly timed intervals release a weight or spring actuated disk to crush the trapped insects within the trap-screen.

Other objects and advantages of my invention will be made apparent in the detail description of the construction and operation of the machine.

The machine is primarily driven by a light power motor of any desired kind, so geared and connected as to drive the three spur gears in the machine at a speed of one revolution every four minutes, so that each of the two screen-traps and each of the two crusher disks will be lowered every two minutes, the traps and crushers being alternately raised and lowered in reciprocal succession.

The matter constituting my invention will be defined in the claims.

I will now describe the details of construction by reference to the accompanying drawings, in which:—

Figure 1 represents a front elevation of the machine.

Fig. 2 represents a rear elevation.

Fig. 3 represents an end elevation.

Fig. 4 represents a top plan view of a rocking lever or beam.

Fig. 5 represents a top plan view of a governor device.

Fig. 6 represents an elevation of a bail for a screen-trap.

Fig. 7 represents a perspective view of a tripping trigger.

Fig. 8 represents a perspective view of an engaging finger.

The machine 1 is mounted on any suitable base X, and is constructed with a central supporting standard 2, which may be of wood or metal. Most of the operating parts are mounted on this standard, but the intermeshing spur gears 4, 5 and $5^a$ are mounted by their journals in bearing boxes $a$ on the pillow blocks 3 which are secured to the base X. The central driving gear 4 will be engaged with any suitable motor and it meshes with, and drives the gears 5, $5^a$ which operate the rocking levers and other parts of the machine. A supporting beam 6 is rigidly secured to the lower part of the standard 2, and carries at its opposite ends the disks 7, $7^a$, which are covered by pads 8, $8^a$ of felt or other absorbent material adapted to receive the liquid or semi-liquid bait. A rocking lever or beam 9, $9^a$, preferably of curved form as shown, is pivotally connected centrally by a pin $b$ to the standard. This lever has thickened and slotted ends $b'$, Fig. 4, for receiving the upper ends of the hangers 10, $10^a$, which are connected thereto by pins $b''$, Figs. 1 and 3. To the lower ends of the hangers are secured the crushing disks 11, $11^a$, of slightly less diameter than the lower disks 7, $7^a$. To the rocking lever 9, about midway between its central pivot and the hangers, are connected, by pins $c$, two spiral springs 12, $12^a$, which at their lower ends are connected by pivot pins $d$, respectively to the gears 5 and $5^a$. To lever 9 there are also pivotally connected by pins $e$ two swinging supporting rods 13, $13^a$, adapted to engage with the seat $f$ of the rest blocks 14, $14^a$, secured by screws to the beam 6, Fig. 2.

A tilting governor lever and screen actuating device 15 is pivotally connected by a central pin $g$ to the upper part of the standard 2 and is provided at its outer ends with upwardly extending lugs $h$ for connecting the fingers 19, $19^a$. At one end of the tilting governor lever is pivotally connected by pin $g'$, a connecting rod 16, which, at its lower end is pivotally connected by pin $k$ to the driving gear 4. To the opposite ends of lever 15 are connected by pivot pins $g'$ the tripping rods 17, 17$^a$, which at their lower ends are connected by pivot pins $l$ to the tripping brackets or triggers 18, 18$^a$, pivoted centrally by pins $i$ to the beam 6. These triggers are angular and have at their outer ends contact noses $n$ for bumping against the swinging support rods 13, 13$^a$ alternately and knocking their lower ends off from the seats $f$ on the rest blocks 14, 14$^a$.

To the upper ends of the slotted lugs $h$, Fig. 5, are connected by pivot pins $p$ the tapering fingers 19, 19$^a$, engaging at their outer ends in the slots $o$ in the guide-way posts 20, 20$^a$. These fingers are, preferably, made of brass and beveled longitudinally as shown in Figs. 1 and 8. The posts 20, 20$^a$ are secured to the outer thickened ends of lever 9, and are also slotted at $o'$, Fig. 5, at right angles to the slots $o$, for passage of the bail 22 which engages with each of the cylindrical trap-screens 21, 21$^a$. These screens are made of a little greater diameter than the crushing disks 11, 11$^a$, so as to freely work up and down over them.

The standard 2, beam 6, rocker lever 9, and disks 7, 7$^a$ and 11, 11$^a$ may be made of wood, for the sake of lightness and cheapness, as it will fully answer the purpose, while the gears, the governor 15, the connecting rod 16 to the driving gear, the tripper rods 17, 17$^a$, the brackets, the support bars and rest-blocks are preferably made of cast iron.

Though I have shown and described disks for the bait pads and crusher disks and cylindrical screen-traps, I wish it understood that such parts may be of other shapes, such as rectangular or polygonal, without departing from my invention. Many changes in details of construction and arrangement may also be made within the spirit and scope of my invention. In the machine illustrated the disks 7, 7$^a$ may be six inches in diameter, while the upper disks 11, 11$^a$ may be five and three eighths inches in diameter. The screens will be five and one half inches in diameter, so as to closely work over the disks 11, 11$^a$.

The parts being at rest, the rocking levers all balanced, and the crusher disks 11, 11$^a$ and screen-traps equally raised on both sides as shown in Figs. 1 and 2, the gears 4, 5 and 5$^a$ will be in position with their pivotal connecting pins on a horizontal line, and neither of the springs under tension, and the supporting rods 13, 13$^a$ will be suspended with their lower ends off from the rest blocks, as indicated in Fig. 2. The tripper triggers 18, 18$^a$ will also be at rest and neither of them bearing on supporting rods. Now in starting the machine, the driving gear 4, Fig. 1, turning to the left in the direction of the arrow, the connecting rod 16 will first push up the right hand end of the governor 15 and put the spring 12$^a$ under tension, thereby pulling the end 9$^a$ of the rocker lever down, and the supporting rod 13, at the left, will rest in the seat $f$ of block 14; (Fig. 2, right hand side) and the screen 21 will remain open for two minutes. The gears 4 and 5, 5$^a$ continuing to revolve the pivot pin $k$ on gear 4 will be carried to its lowest point, pulling down the connecting rod 16 and the right hand end of the governor 15 and causing the finger 19$^a$ to pass below and engage the bail 22$^a$ on the right. The finger 19 on the left being tilted downward and outward will now release the bail 22 and permit the screen 21 to fall upon the disk 7. This release is due to its angular position and the consequent increased distance of the pivot pin $p$ from the point of engagement with the bail. The tripping trigger 18 will now push the supporting rod 13 off from the seat $f$ on the rest block 14 (at left Fig. 1) and the spring 12 will immediately act to pull the end 9 of the rocker lever down, thereby causing the crusher disk 11 to suddenly fall or close down on the disk 7 within the screen 21 and kill the entrapped insects.

As the gears continue to revolve these operations will be repeated, so as to alternately depress the screens and crusher disks at opposite ends of the machine. No attention will be required except to occasionally remove dead insects from the lower disks, and renew the bait on the pads.

The brackets 24, 24$^a$ at the inside upper ends of the posts 20, 20$^a$ act as fulcrums for the fingers when either end of the tilting governor 15 is pulled down by the rod 16 so as to thereby raise the bail and screen-trap.

Having thus described my invention, what I claim, and desire to secure by this Letters Patent is:—

1. In a machine of the character described, the combination with a lower fixed plate, of a vertically movable screen-trap adapted to be seated on said fixed plate, and a vertically movable crusher plate adapted to work inside of the screen-trap and make contact with the fixed plate after the screen-trap has been seated thereon, and operating mechanism therefor.

2. In a machine of the character described, the combination with a lower fixed plate carrying bait, of a rocking lever carrying a vertically movable crusher plate adapted to make contact with the fixed plate, and a vertically movable screen-trap working over the crusher plate, and means for raising the trap after contact of the plates.

3. In a machine of the character described, the combination with a lower fixed plate for carrying bait, of a pivoted rocking lever carrying at its outer end a crusher plate adapted to make contact with the fixed plate, means for raising the lever with its crusher plate, a retracting spring for pulling down the lever and plate, a vertically movable screen-trap and means for alternately engaging and holding it up, and for releasing it to fall upon the fixed plate.

4. In a machine of the character described, the combination with a fixed plate for carrying bait, of a pivoted rocking lever carrying at its outer end a crusher plate adapted to make contact with the fixed plate, means for raising the lever with its crusher plate, a spur gear, a retracting spring connected to said lever and the gear for pulling down the lever and its crusher plate, a screen-trap working over the crusher plate and at intervals being seated on the fixed plate, and means for engaging and raising the trap off from the fixed plate after the crusher plate has made contact therewith.

5. In a machine of the character described, the combination with a fixed plate for carrying bait, of a vertically movable crusher plate adapted to make sudden contact with the fixed plate, and a screen-trap surrounding the crusher plate and closing the fixed plate for retaining the insects over the latter while being crushed.

6. In a machine of the character described, the combination with a fixed plate for carrying bait, of a pivoted rocking lever carrying a crusher plate positioned to make contact with the fixed plate, means for raising the lever with its crusher plate, a depending support-rod connected to the lever, a fixed rest block having a seat for the lower end of said rod, a spring acting to pull down said lever and its crusher plate onto the fixed plate, a tripping device for knocking the support-rod off from the rest block, so that the retracting spring can act, and a vertically movable screen-trap adapted to surround the crusher plate and rest on the fixed plate while insects are being crushed.

7. In a machine of the character described, the combination with a fixed support and bait plate thereon, of a pivoted rocking lever carrying a crusher plate above the fixed plate, a movable screen-trap working over the crusher plate and making contact with the fixed plate, a pivoted and tilting governor device having a finger adapted to alternately engage the screen-trap and release the same, a support rod depending from the rocker lever, a fixed rest block for the same, a pivoted tripper adapted to bear on said support rod, a tripper rod pivotally connecting to the governor and to said tripper, an operating gear and a retracting spring connecting to the gear and to the rocking lever for suddenly pulling it and its crusher plate down upon the fixed plate.

8. An insect trapping and killing machine comprising a pair of fixed spaced bait plates, a double acting, centrally pivoted rocking lever carrying at its ends a pair of crusher plates above the fixed plates, a centrally pivoted tilting governor having extended pivotally connected fingers, a pair of vertically movable screen-traps surrounding the crusher plates and having each a bail adapted to be engaged by said fingers, guide-way posts on the rocking lever for the bails and fingers, a driving gear and two driven gears meshing therewith, a connecting rod pivoted to the governor and the driving gear, a pair of springs connecting the rocking lever with the driven gears for operating the lever with its crushing plates, fixed rest-blocks, supporting means on the rocking lever and adapted to engage with said blocks, and tripping mechanism connecting with the governor for alternately disengaging the supporting means, whereby the crusher plates will be alternately and suddenly depressed by the springs upon the fixed plates.

9. An insect trapping and killing machine comprising a pair of fixed spaced bait plates, a double acting, centrally pivoted rocking lever carrying at its ends a pair of crusher plates above the fixed plates, resilient means connecting with said lever at each side of its central pivot for rocking it, a pair of vertically movable screen-traps surrounding said crusher plates, and means for lowering and raising said traps for alternately making contact with, and exposing, the fixed plates, to retain insects while either crusher plate is being lowered to crush the entrapped insects, and suitable operating mechanism for said parts.

10. In a machine of the character described, the combination with a fixed bait carrying plate, of a rocking lever carrying a crusher plate above the fixed plate, a pivoted governor having an extended finger, a screen-trap surrounding said crusher plate, and adapted to be engaged by said finger to raise it from, and lower it upon, said fixed plate, a driven gear, a resilient member connecting it with said rocking lever, a fixed rest block, a supporting rod depending from the rocking lever in position to be seated at its lower end on said block, and a tripper device connecting with the governor and in position to push the supporting rod from its seat and permit the resilient member to suddenly depress the crusher plate upon the fixed plate.

In testimony whereof, I affix my signature.

ERNST BEHR.

Witnesses:
HELEN A. BROPHY,
JOHN D. SCOTT.

Copies of this patent may be obtained for five cents each, by addressing the "Commissioner of Patents, Washington, D. C."